United States Patent
Suzuki

(10) Patent No.: US 6,570,852 B1
(45) Date of Patent: May 27, 2003

(54) RELAY COMMUNICATION SYSTEM

(75) Inventor: Mitsutaka Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/320,456

(22) Filed: May 27, 1999

(30) Foreign Application Priority Data

May 28, 1998 (JP) .......................................... 10-146968

(51) Int. Cl.$^7$ ............................................... G01R 31/08
(52) U.S. Cl. ...................... 370/235; 370/231; 370/230; 370/516; 370/519
(58) Field of Search .................. 370/229, 230, 370/231, 232, 233, 234, 235, 236.1, 252, 397, 399, 395.21, 395.3, 401, 402, 409, 508, 516, 517, 519, 520, 348, 432

(56) References Cited

U.S. PATENT DOCUMENTS

| | | | |
|---|---|---|---|
| 5,331,635 A | * 7/1994 | Ota | 370/401 |
| 5,933,605 A | * 8/1999 | Kawano et al. | 709/238 |
| 5,940,370 A | * 8/1999 | Curtis et al. | 370/231 |
| 6,246,696 B1 | * 6/2001 | Yamaguchi et al. | 370/475 |

FOREIGN PATENT DOCUMENTS

| | | |
|---|---|---|
| JP | 57-16871 | 10/1982 |
| JP | 61-148941 | 7/1986 |
| JP | 8-256177 | 10/1996 |
| JP | 9-284277 | 10/1997 |

* cited by examiner

*Primary Examiner*—Douglas Olms
*Assistant Examiner*—Phirin Sam
(74) *Attorney, Agent, or Firm*—Foley & Lardner

(57) ABSTRACT

In a case where a receiving station is performing a relay transmission by uniquely identifying a transmission data on a network on the basis of an identifier of a communication terminal of a transmitting station and an identifier of the data, the transmitting station confirms the progression of operation of the relay station and a communication terminal of the transmitting station determines a data transmission timing for checking an end of the relay communication according to a delay time determined by the longest one of measured response times of receiving stations. Since it is possible to measure the delay time of the relay communication to thereby predict a time instance at which the data transmission is ended, it becomes possible to minimize the number of frames sent to a circuit by controlling a frame transfer timing used to monitor the state of link.

6 Claims, 5 Drawing Sheets

Link Conection Frame F1

| Communication Identifier | Transmitter Identifier | Transmission Time | | Sequence No. | Link Connection Request |
|---|---|---|---|---|---|

Link Cut Frame F2

| Communication Identifier | Transmitter Identifier | Transmission Time | | Sequence No. | Link Cut Request |
|---|---|---|---|---|---|

Ferced End Request Frame F3

| Communication Identifier | Transmitter Identifier | Transmission Time | | Sequence No. | Ferced End Request |
|---|---|---|---|---|---|

ACK Response Frame F4

| Communication Identifier | Transmitter Identifier | Transmission Time | | Sequence No. | ACK Response |
|---|---|---|---|---|---|

NAC Response Frame F5

| Communication Identifier | Transmitter Identifier | Transmission Time | | Sequence No. | NAC Response |
|---|---|---|---|---|---|

Destination Assignment Frame F6

| Communication Identifier | Transmitter Identifier | Transmission Time | | Sequence No. | Destination List |
|---|---|---|---|---|---|

Data Frame F7

| Communication Identifier | Transmitter Identifier | Transmission Time | | Sequence No. | Data Frame |
|---|---|---|---|---|---|

Delay Inquiry Frame F8

| Communication Identifier | Transmitter Identifier | Transmission Time | | Sequence No. | Delay Inquiry |
|---|---|---|---|---|---|

Delay Response Frame F9

| Communication Identifier | Transmitter Identifier | Transmission Time | | Sequence No. | Delay Information List |
|---|---|---|---|---|---|

| Destination 1 | Phase No. | Dely Time | Destination 2 | Phase No. | Dely Time |
|---|---|---|---|---|---|

FIG.2

Destination Management Information

| Communication Identifier | Phase No. | Transmitter Identifier |
|---|---|---|
| Destination 1 | Phase No. | Delay Time |
| Destination 2 | Phase No. | Delay Time |
| Destination 3 | Phase No. | Delay Time |
| ⋮ | ⋮ | ⋮ |
| Destination n-1 | Phase No. | Delay Time |
| Destination n | Phase No. | Delay Time |

Phase No. 0 : Link not Connected Yet
1 : Waiting for Link Establishment
2 : Link Established
3 : Link Interaupted
4 : Destination being Notified
5 : Destination Notice Ended
6 : Data being Transmitted
7 : Data Transmission Ended

FIG.3

RELAY COMMUNICATION SYSTEM

CROSS REFERENCE TO RELATED APPLICATIONS

The present invention claims priority from Japanese Patent Application No. 10-146968 filed May 28, 1998, the contents of which are incorporated herein by reference.

BACKGROUND OF THE INVENTION

1. Field of the Invention

The present invention relates to a relay communication system for realizing a multiple address communication by repeating a point to point data transfer a plurality of times.

2. Description of Related Art

As a communication system for performing a multiple address communication, a relay communication is known, in which a multiple address communication is realized by performing a data transmission between a communication terminal and another communication terminal and repeating this between a plurality of communication terminals sequentially to relay a data (inter-point asynchronous communication). In such relay communication system, an originating communication terminal confirms whether or not the data is received by all of other communication terminals in the same link, by response from the last communication terminal of the link.

In general, in a case where a communication is performed by utilizing circuits having different data transmission rates, maximum transfer unit (MTU) may be different every circuit. In the usual communication control system, when the MTU is different on a communication path, data may be divided or combined by performing a fragmentation, etc. In the usual circuit, however, it is necessary to wait for a response of data reception in order to confirm whether or not data can be received. Such waiting for the reception response may cause the communication efficiency to be very low when looked from the originating communication terminal. In a circuit in which a delay time is increased due to fragmentation, etc., even when a fixed level, preceding control is used, the circuit can not be used efficiently since a next transmission must be suspended until a response of data reception is received, even when data is normally being transmitted.

On the contrary, in the relay communication system, a repeating communication terminal transmits a data reception response to a transmitting terminal immediately after the repeating terminal confirms a reception of data. Since, in this system, the transmitting terminal always transmits data to a next communication terminal, the communication circuit can be used efficiently. In this case, however, it is impossible due to delay caused by the inter-circuit relay to confirm whether or not the transmitting terminal a normally transmit data to the receiving terminal. Therefore, each communication terminal confirms whether or not the relay communication between it and a next communication terminal is normally, completed by monitoring the next communication terminal next even after the communication to the next communication terminal is ended.

In such conventional relay communication system, in order to confirm whether the relay communication is normally completed on the side of the transmitting terminal, the first, transmitting terminal must wait for the response from the last communication terminal and, therefore, the status of the link must be monitored during the relay communication is being performed, by securing the link. However, when a data transmission is performed through circuits having different transmission rates (for example, a transmission rate inside a protocol transformation device such as a gateway is different from that outside the gateway in a network connected through the protocol transformation device) and a large delay occurs due to data error, etc., a transmitting communication terminal can not get hold of the delay time caused by a multiple address communication. Therefore, it is necessary to continuously transmit data for checking the status of the link (for checking an operation of the other side terminal caused by a frame transfer) for a time period necessary to get hold of the delay time and, thus, the coefficient of utilization of the circuit is lowered.

SUMMARY OF THE INVENTION

An object of the present invention is to provide a relay communication system capable of optimally controlling the usage of circuit during a delay time which occurs when a relay communication (receiving control and transmission control) is performed asynchronously between communication terminals and capable of tightening a management of the status of communication. Another object of the present invention is to provide a guaranty and monitor method for data transfer and a communication terminal using the same method.

In a first aspect of the present invention, a relay communication system in which a multiple address communication is realized by repeating a point to point communication a plurality of times, comprises means for uniquely identifying a transmitting data on a network on the basis of an identifier of a communication terminal of a transmitting station and an identifier of the data, means for recognizing the progression of relay communication from the transmitting station when a receiving station is performing a relay transmission, means for obtaining a delay time until a receiving terminal giving the latest response by measuring response times from the communication terminal of the transmitting station and means for determining a transmission timing of data for checking an end of the relay communication, according to the delay time.

According to a second aspect of the present invention, the communication terminal used in the above mentioned relay communication system comprises a receiving control portion for receiving data in frame unit from a receiving communication circuit, a transmission control portion for transmitting data in frame unit from a transmitting communication circuit, a memory portion for temporarily storing the receiving data, a time management portion for managing an internal time and burying time stamps in the receiving frame and the transmitting frame, a destination management portion for managing destinations, a data identification portion for uniquely identifying a communication to which the frames belong, on the basis of the communication identifier and the transmitter identifier in the frame, to obtain the address from the destination management portion and storing the address in the memory portion, a delay management portion for measuring a delay time due to a relay communication by transmitting a monitor frame and receiving a response frame at a constant interval through the transmitting control portion and the receiving control portion and a main control portion for controlling the whole communication terminal.

The destination management portion may include a destination management information table for registering a transmitter identifier information indicative of an identifier number of the transmitting communication terminal, which is uniquely determined in the network, a communication identifier information indicative of an identifier number of a communication managed in transmitter unit, a phase number information which is a value indicative of the progression of the communication, a destination information indicative of addresses of communication terminals of the respective destinations, a delay information obtained by a difference between a transmitting time instance and a response time instance indicated in the response frame and a phase number information.

In a case where this communication terminal is used as the transmitting station, the relay communication system may be constructed in such a way as described below. When data is inputted to the memory portion, the transmission control portion starts a data transmission under control of the main control portion. The transmitting station transmits a link connection frame to a first receiving station of addressed receiving stations and, when the transmitting station receives an acknowledge response from the receiving station, it is confirmed that the connection to the receiving station is established. Upon the established connection to the receiving station, the transmitting station starts to transfer data to the receiving station by burying an address in an address assignment frame. When the transmitting station receives an acknowledge frame from the receiving station, it is confirmed that a notice of address is completed. The delay management portion obtains a delay time from a difference between a transmission time and a response time contained in the response frame with respect to the acknowledge response from the receiving station and start a timer corresponding to the delay time. When the timer times up, the transmitting station transmits a delay inquiry response frame, it transmits a delay inquiry response frame. In a case where the delay inquiry frame is not transmitted, it transmits a data frame. When the transmitting station receives a delay response frame from the receiving station in response to the delay inquiry frame, it registers the delay time in the delay response frame in the delay management portion. Thereafter, the transmitting station transmits the delay inquiry frame every delay time. After the transmission of all data frames is completed, the timer corresponding to the delay time is started. When this timer times up, the transmitting station transmits a delay inquiry frame and waits for a delay inquiry response frame. When the progression of relay communication notified by the delay inquiry frame indicates an end of communication, the communication is deemed as being normally ended and the transmitting station transmits a link cut frame. When the transmitting station receives an acknowledge response frame thereto, the communication is ended.

In a case where the communication terminal is used as a receiving station, the communication system may be constructed in such a way as described below. When receiving control portion receives a link connection frame, the receiving station starts a receiving operation by transmitting an acknowledge response frame in response to the link connection frame. When the receiving station receives a destination assignment frame, it notifies the destination management portion of the destination assignment frame, extracts a real data from the data frame received by the receiving control portion and writes it in the memory portion. When the data frame is received, a response time is set in the acknowledge frame and the latter is transmitted. When the link cut frame is received, a completion of communication is noticed to the main control portion and an acknowledge response frame is transmitted to end the communication. When the communication terminal is used as a relay station, it operates as the receiving station with respect to the transmitting station and as the transmitting station with respect to the destination station.

According to a third aspect of the present invention, a data transfer guaranty monitor method in a relay communication system in which a multiple address communication is realized by repeating a point to point communication a plurality of times comprises the steps of uniquely identifying a transmitting data on a network on the basis of an identifier of a communication terminal of a transmitting station and an identifier of data, recognizing in real time a relay transmission by recognizing the progression of the relay communication from the transmitting station when a receiving station performs the relay transmission, measuring a response time of the other side of the communication by the communication terminal of the transmitting station to obtain a delay time of a receiving station whose response is the latest to thereby measure a delay time caused by the relay communication and determining a data transmission timing for checking an end of the relay communication according to the delay time.

In this method, the delay time with respect to the receiving station can be calculated by setting a transmission time information indicative of a transmission time of an information frame, setting the transmission time information in the information frame and a response time information indicative of a transmission time of a response frame corresponding to the information frame sent from the receiving station to the transmitting station in the response frame and obtaining in the transmitting station a difference between the transmission time and the response time information set in the response frame.

BRIEF DESCRIPTION OF THE DRAWINGS

The above mentioned and other objects, features and advantages of the present invention will become more apparent by reference to the following description of the invention taken in conjunction with the accompanying drawings, in which:

FIG. 2 shows constructions of frames used in a communication;

FIG. 3 shows an example of a data table of a destination management information according to the present invention;

DETAILED DESCRIPTION OF THE PREFERRED EMBODIMENTS

First, the present invention will be summarized. A transmitting data on a network, that is, data corresponding to one communication, which is transmitted in frames from a communication circuit, is uniquely identified on the basis of an identifier of a communication terminal (transmitter) of a transmitting side (transmitting station) and an identifier of the data. In a case where a communication terminal (receiver) of a receiving station (relay station) is performing a relay transmission (relay communication) of frames, the communication to which the frames belong is identified as mentioned above, the progression of communication is confirmed by the transmitting station so that the relay transmission is confirmed on real-time basis. The communication terminal of the transmitting station measures a response time (delay time produced between the transmitting station and the receiving station and between receiving stations which are performing the relay communication) of the other side of the relay communication (communication terminal of the receiving station) to obtain a delay time between the transmitting station and a receiving station whose response is the latest to thereby measure the delay time caused by the relay communication. By determining a transmission timing of data (for monitoring an end of the relay operation by the transmitting station) for checking an end of the relay communication according to the measured delay time, it becomes possible to do not transmit excessive data on the communication circuit to thereby minimize the coefficient of circuit utilization.

Although the transmitter performs only the point to point data transmission, it must monitor a result of relay transmission. Therefore, it is necessary to monitor the relaying state since such an operation as to temporarily interrupt the communication must be required if the relay takes a considerable time. According to the present invention, however, it becomes possible to control the timing of frame transfer, which is used to monitor the status of the link, by measuring the delay time due to the relay communication and to predict a time at which the data transmission is ended on the basis of the delay time. Therefore, it is possible to minimize the number of frames to be transmitted to the circuit without any influence on the original asynchronous processing.

Now, embodiments of the present invention will be described in detail with reference to the drawings.

Figure 1:
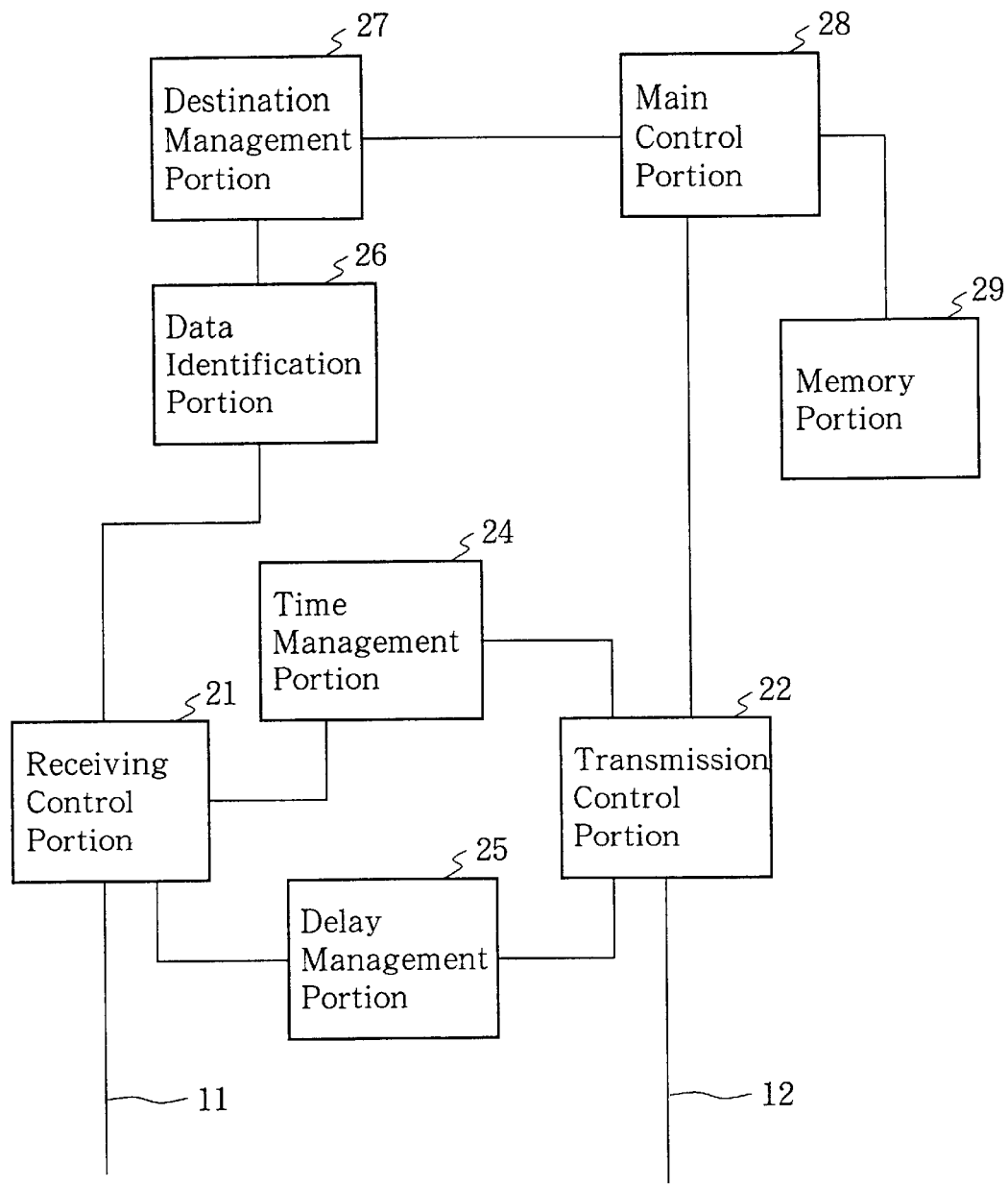
FIG. 1 is a block diagram showing a construction of a communication terminal according to an embodiment of the present invention.

FIG. 1 is a block diagram showing a construction of a communication terminal according to an embodiment of the present invention. In FIG. 1, the communication terminal comprises a receiving control portion 21 which receives data from a receiving communication circuit 11 in frames, transmitting control portion 22 which transmits data (frames containing a destination) from a transmitting circuit 12 in frames, a memory portion 29 for temporarily storing a receiving data, a time management portion 24 for managing an internal time and burying a time stamp in a receiving frame and in a transmitting frame, a destination management portion 27 for managing a destination (address) of the of the other side of communication, a data identification portion 26 for uniquely identifying (determining an attribute of data) a communication, to which the frames belongs, on the basis of a communication identifier and a transmitter identifier in a frame, obtaining the destination from the destination management portion 27 and storing the destination in the memory portion 29, a delay management portion 25 for measuring a delay time due to a relay communication by transmitting a monitor frame and receiving a response frame at constant intervals through the transmitting control portion 22 and the receiving control portion 21 and main control portion 28 for controlling a whole communication system including the above mentioned portions. Incidentally, a read and write with respect to the memory portion 29 is performed by the main control portion 28 and other portions access to the memory portion 29 through the main control portion 28.

FIG. 2 shows formats of frames used in the communication. Roles of the respective frames are as follows:

"Link Connection Frame F1": to request the other side of a communication.

"Link Cut Frame F2": to request the other side receiving station of a communication end.

"Forced End Request Frame F3": to request a forced end of communication.

"Acknowledge (ACK) Frame F4": to notify a success of frame receiving.

"Negative Acknowledge (NAC) Frame F5": to notify a detection of abnormality in frame receiving.

"Destination Assignment Frame F6": to notify the other side of a multiple address communication.

"Data Frame F7": to be used in a transmission of real data.

"Delay Inquiry Frame F8": to request a notice of the progression of a relay transmission.

"Delay Response Frame F9": to notify the progression of communication of the communication terminal.

In transmitting real data, "Data Length" and "Frame Check Sequence (FCS) Information" for data error recognition are further added to the data frame F7.

Elements in the respective frames are as follows:

"Destination List" of the destination assignment frame F6 is a row of addresses of destination communication terminals.

"Communication Identifier" and "Transmitter Identifier" of each of the frames are a serial number uniquely assigned to identify the communication and an identifier of the transmitting communication terminal, respectively. The transmitter identifier is uniquely determined by the system.

"Transmission Time" is a time stamp indicative of a time instance at which a corresponding frame is transmitted. In various information transmission frames other than the frames F1, F2, F3, F6, F7 and F8, the transmission times indicate transmission time instances at which the respective frames are transmitted. The transmission times in the frames F4, F5 and F9 indicate the transmission time instances at which frames to which the responses are transmitted are transmitted.

"Response Time" in each of the frames F4, F5 and F9 is a time stamp indicative of a time instance at which the response frame is transmitted.

"Delay Time" in a delay information list of the frame F9 is a delay time of transmission in a relay station.

"Sequence No." in each of the frames F1 to F9 is a serial number of the frame transmitted.

"Data" in the data frame F7 is a real data.

"Delay Inquiry Data" in the delay inquiry frame F8 is a command requesting a delay inquiry.

"Delay Information List" in the delay response frame F9 is a list of delay information between the receiving stations.

FIG. 3 shows a content (referred to as "Destination Management Information", hereinafter) of a management table (provided within the destination management portion 27) used to manage the communication.

In FIG. 3, a "Transmitter Identifier" indicates an identifier number uniquely determined on the network.

"Communication Identifier" indicates an identification number of a communication for performing a management in transmitter unit.

"Phase No." is a value indicative of the progression of communication. The phase number is defined here as follows:

Phase No. 0: the connection to the link is not established.

Phase No. 1: waiting an establishment of the link.

Phase No. 2: the link established.

Phase No. 3: the link is cut off.

Phase No. 4: destination is being notified.
Phase No. 5: destination notice ended.
Phase No. 6: data is being transmitted.
Phase No. 7: data transmission ended.

"Delay time" is obtained from a difference between the transmission time instance and the response time instance described in the response frame.

By utilizing the communication identifier and the transmitter identifier among the above mentioned destination management information, it is possible to uniquely identify data transmitted back and forth on the network. The communication terminal manages the communication by the identifier indicative of the destination, the phase No. and the delay time.

Now, an operation of the communication terminal shown in FIG. 1 will be described when the communication terminal is used as a transmitting station.

A destination is notified from the main control portion 28 to the destination management portion 27. The main control portion 28 writes the transmitting data in the memory portion 29. When the data is inputted to the memory portion 29, the transmission control portion 22 starts a transmission to the designated stations and monitors a response from the same station. First, the link connection frame F1 is transmitted from the transmitting station to a first one of the designated receiving stations. When the transmitting station receives, from the receiving station, an ACK response frame F4 responding to the link connection frame, it is deemed that a connection to the link is established and the transmitting station starts a data transfer to the receiving station through the established connection.

Then, the transmitting station buries the destination in the destination assignment frame F6 and transmits the destination assignment frame to the receiving station. When the transmitting station receives an ACK response frame F4 responding to the destination assignment frame, it is deemed that a notice of destination is completed.

In this case, the delay management portion 25 obtains a delay time as a difference between the transmission time instance contained in the response frame responding to the transmission frame and a time instance of response. The delay management portion 25 activates a timer (housed in the delay management portion 25 and not shown in FIG. 1) which times a time period corresponding to the delay time and, when the timer times up, the delay management portion 25 transmits the delay inquiry frame F8 through the transmission control portion 22 to the receiving station. When the timer is still timing, the delay management portion 25 transmits not the delay inquiry frame F8 but the data frame F7 read out from the memory portion 29 through the main control portion 28.

When the receiving control portion 21 receives the delay response frame F9 responding to the delay inquiry frame F8 from the receiving station, the transmission control portion 22 notifies the delay management portion 25 of a delay time in the delay response frame F9. The delay management portion 25 activates a timer corresponding to the delay time and, thereafter, transmits the delay inquiry frames F8 to the receiving station at an interval corresponding to the delay time. When the delay time contained in the delay response frame F9 is different from the delay time in the preceding reception of the delay response, the delay time in the delay response frame is set again.

The data frame F7 and the delay inquiry frame F8 are transmitted as mentioned and, when the transmission of the whole data frame F7 is completed, the delay management portion 25 activates the timer corresponding to the delay time. When the timer of the delay management portion 25 times up, the transmission control portion 22 transmits the delay inquiry frame F8 to the receiving station and waits for the delay response frame F9 therefor. When the delay response frame F9 which indicates an end of the relay operation is received, it is deemed that the communication is normally ended and the transmission control portion 22 transmits the link cut frame F2 and the communication is ended upon a reception of the ACK response frame F4 corresponding to the link cut frame.

An operation of the communication terminal shown in FIG. 1 when it is used as a receiving station will be described.

When the receiving control portion 21 receives the link connection frame F1 from a transmitting station, the receiving station starts a receiving operation and returns a necessary response to the transmitting station. In this receiving operation, the receiving control portion 21 transmits the ACK response frame F4 responding to the link connection frame. When the receiving station receives the destination assignment frame F6, the receiving control portion 21 notifies the destination management portion 27 of the destination assignment frame through the data identification portion 26. In a case where the communication terminal is used as a relay station, the destination management portion 27 of the communication terminal produces a new destination information including the destination assignment frame F6 from which the communication terminal itself is excluded, as to be descried in detail later. However, the communication terminal as the receiving station does not perform the relay operation since there is no next destination. The receiving control portion 21 extracts a real data from the data frame F7 received through the data identification portion 26, the destination control portion 27 and the main control portion 28 and writes it in the memory portion 29. When the receiving station receives the data frame F7, it sets a response time instance in the ACK frame F5 and transmits it to the transmitting station. When the receiving control portion 21 receives the link cut frame F2, it is deemed that the communication is ended and the receiving control portion 21 notifies the main control portion 28 of the end of communication and transmits the ACK response frame to the transmitting station. Upon the transmission of the ACK response frame, the communication is ended.

Now, an operation of the communication terminal shown in FIG. 1 when used as the relay station will be described.

When the receiving control portion 21 receives the link connection frame F1, a receiving operation is started. The transmitting control portion 22 transmits the ACK response frame F4 in response to the link connection frame. When the receiving control portion 21 receives the destination assignment frame F6, it notifies the destination management portion 27 of the destination assignment frame. In the relay station, the destination management portion 27 newly produces a destination information by excluding the information of the relay station itself from the destination assignment frame F6. If there is no next destination, the previously described operation as the receiving station is performed. If there is a next destination, the receiving control portion 21 writes the received data in the memory portion 29 through the data identification portion 26, the destination control portion 27 and the main control portion 28. The transmitting control portion 22 starts a transmission when the data is written in the memory portion 29.

First, the link connection frame F1 is transmitted to a first one of the receiving stations of the destination. When the relay station receives the ACK response frame F4 from the first receiving station, it is deemed that a connection between the relay station and the first receiving station is established and the data transfer is started.

Then, a similar processing to the previously mentioned processing performed as the transmitting station is performed by the relay station to bury the destination in the destination assignment frame F6. The destination assignment frame F6 containing the destination is transmitted to the receiving station. Similarly to the link connection frame F1, when the ACK response frame F4 from the receiving station, it is deemed that the notice of the destination is ended. In this case, the delay management portion 25 obtains a delay time from a difference between the transmission time instance and the response time instance which are contained in the response frame to the transmission frame. With the delay time thus obtained, the delay management portion 25 activates a timer corresponding to the delay time and, when the timer times up, the transmitting control portion transmits the delay inquiry frame F8. When the delay inquiry frame F8 is not transmitted (the timer does not time up), the transmitting control portion transmits the data frame F7.

When the receiving control portion receives the delay response frame F9 from the receiving station correspondingly to the delay inquiry frame F8, it notifies the delay management portion 25 of the delay time in the delay response frame F9. The delay management portion 25 activates a timer corresponding to the delay time. Thereafter, the transmitting control portion transmits the delay inquiry frames F8 to the receiving station at an interval corresponding to the delay time.

As mentioned, the transmitting control portion transmits the data frame F7 and the delay inquiry frame F8 and, when all data is transmitted, activates a timer corresponding to the delay time. When the timer times up, the transmitting control portion transmits the delay inquiry frame F8 and the receiving control portion waits for the delay response frame F9. When the delay response frame F9 indicates an end of relay operation, it is deemed that the communication is normally ended. Then, the transmitting control portion transmits the link cut frame F2 and, upon a reception of the ACK response frame F4 to the link cut frame, the communication is ended.

Figure 4:
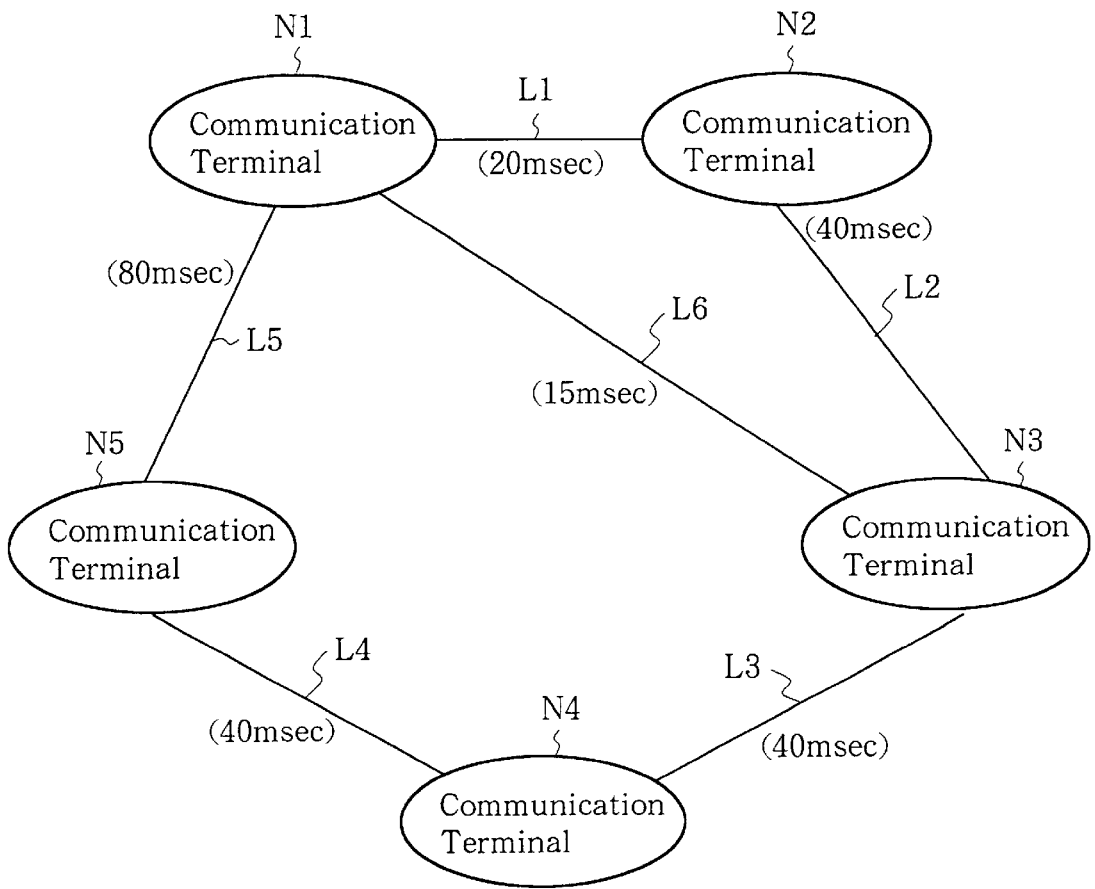
FIG. 4 shows an example of a circuit construction of a network.

FIG. 4 shows an example of construction of a network circuit of the communication system of the present invention.

In FIG. 4, the communication system comprises five communication terminals N1, N2, N3, N4 and N5. The communication terminals N1 and N2 are connected through a communication circuit L1, the communication terminals N2 and N3 are connected through a communication circuit L2, the communication terminals N3 and N4 are connected through a communication circuit L3, the communication terminals N4 and N5 are connected through a communication circuit L4 and the communication terminals N5 and N1 are connected through a communication circuit L5. The communication terminals N1 and N3 are connected through a communication circuit L6.

An example of delay times when the respective communication circuits are utilized is shown below.

L1: 20 msec,
L2: 40 msec,
L3: 40 msec,
L4: 40 msec,
L5: 80 msec,
L6: 15 msec.

Figure 5:
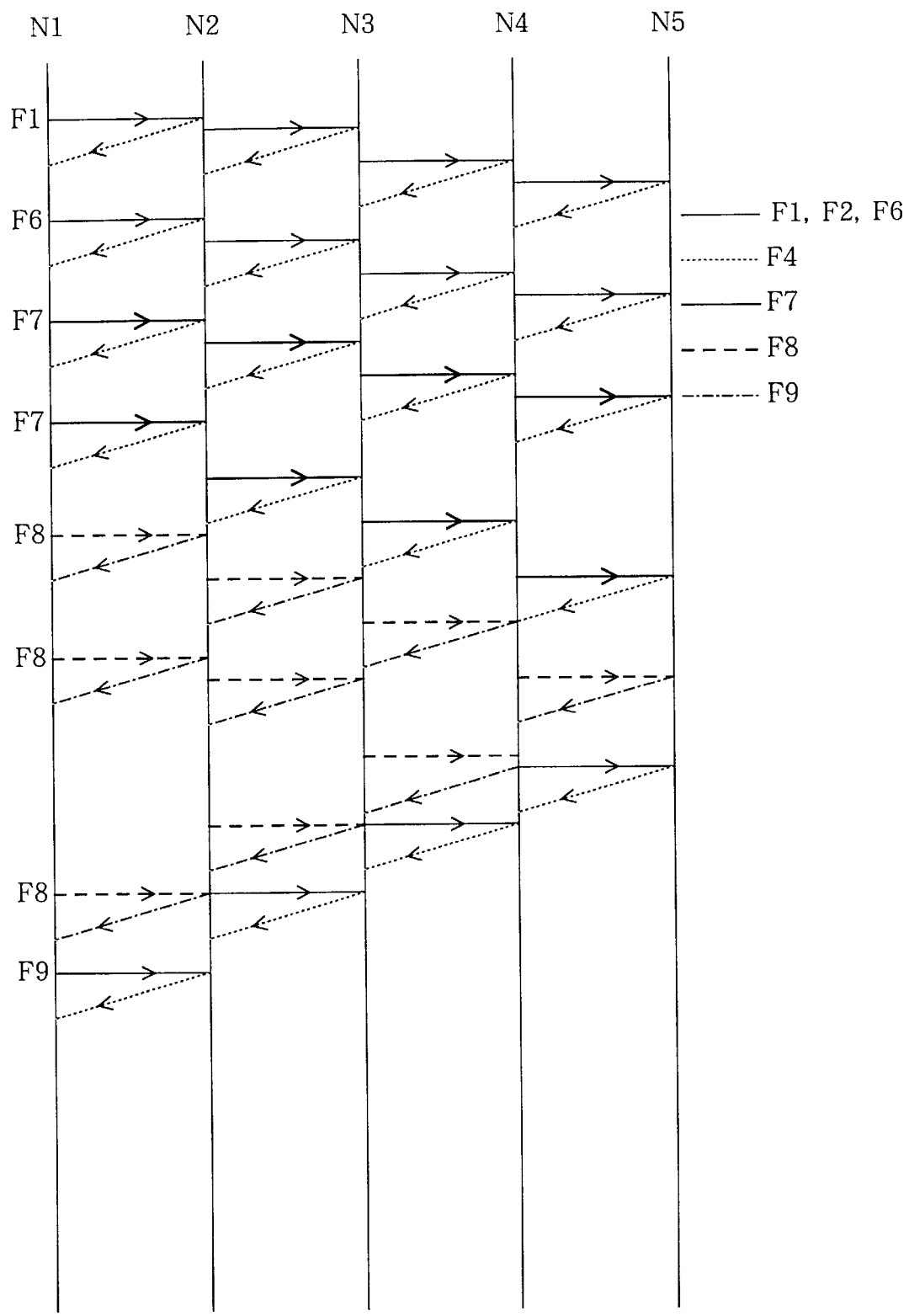
FIG. 5 shows an example of a communication sequence in the network shown in FIG. 4.

FIG. 5 shows a communication sequence when a multiple address communication is performed by this communication system.

An operation of the communication system will be described with reference to FIG. 5, with the communication terminal N1 being a transmitting station which performs a multiple address communication with respect to the other communication terminals N2 to N5 as receiving stations and relay stations. Addresses of the respective communication terminals N1, N2, N3, N4 and N5 are assumed as 000, 001, 002, 003 and 004, respectively.

First, a destination is determined by the communication terminal N1. The communication terminal N1 performs a communication with the communication terminal N2. The communication terminal N2 transmits data received from the communication terminal N1 to the communication terminal N3. The communication terminal N3 transmits the data to the communication terminal N4 and the latter transmits it to the communication terminal N5. By performing the relay transfer of data in this manner, the multiple address communication is realized.

The destination management information of the communication terminal N1 (transmitter) when the destination (address) list is "000", "001", "002", "003" and "004", the communication identifier is "001" and the transmitter identifier is "000" is initialized as

[communication identifier (001)-phase No. (0)-transmitter identifier (000), destination (001)-phase No. (0)-delay time (000), destination (002)-phase No. (0)-delay time (000), destination (003)-phase No. (0)-delay time (000), destination (004)-phase No. (0)-delay time (000)].

First, the link connection frame F1 is transmitted from the communication terminal N1 to the communication terminal N2. When the transmission from the communication terminal N2 is completed, the destination management information of the communication terminal N1 becomes

[communication identifier (001)-phase No. (1)-transmitter identifier (000), destination (001)-phase No. (0)-delay time (000), destination (002)-phase No. (0)-delay time (000), destination (003)-phase No. (0)-delay time (000), destination (004)-phase No. (0)-delay time (000)].

Thereafter, when the communication terminal N1 receives the ACK response frame F4 from the communication terminal N2, the ink connection is established. At this time, a delay time is obtained by a difference between the transmission time instance of the link connection frame F1 and the response time instance of the ACK response frame F4. Since, in this example, the delay time of the communication circuit L1 is preliminarily determined, the predetermined delay time is utilized. Therefore, the destination management information of the communication terminal N1 becomes

[communication identifier (001)-phase No. (2)-transmitter identifier (000), destination (001)-phase No. (0)-delay time (020), destination (002)-phase No. (0)-delay time (000), destination (003)-phase No. (0)-delay time (000), destination (004)-phase No. (0)-delay time (000)].

When the link is established, the communication terminal N1 notifies the communication terminal N2 of the destination assignment frame F6. The communication terminal N2 returns the ACK response frame F4 to the communication terminal N1 and then performs the link connection to the communication terminal N3 according to the destination. When the ACK response frame F4 is received, the destination management information of the communication terminal N1 becomes

[communication identifier (001)-phase No. (5)-transmitter identifier (000), destination (001)-phase No. (0)-delay time (020), destination (002)-phase No. (0)-delay time (0), destination (003)-phase No. (0)-delay time (0), destination (004)-phase No. (0)-delay time (0)].

In the communication terminal N2, the destination management information is similarly managed. The destination management information of the communication terminal N2 at a time when it transmits the link connection frame F1 to the communication terminal N3 becomes

[communication identifier (001)-phase No. (1)-transmitter identifier (000), destination (002)-phase No. (0)-delay time (0), destination (003)-phase No. (0)-delay time (0), destination (004)-phase No. (0)-delay time (0)].

When the link is established in the communication terminal N2, the destination management information of the communication terminal N2 becomes

[communication identifier (001)-phase No. (2)-transmitter identifier (000), destination (002)-phase No. (0)-delay time (040), destination (003)-phase No. (0)-delay time (0), destination (004)-phase No. (0)-delay time (0)].

When the link is established, the communication terminal N2 notifies the communication terminal N3 of the destination assignment frame F6. Upon the reception of the destination assignment frame F6, the communication terminal N3 makes a link connection to the communication terminal N5 according to the destination. By connecting the links sequentially as mentioned, a transmission path is determined.

The destination management information of the respective communication terminals when the link is established is as follows:

As mentioned, the information of the communication terminal N1:

[communication identifier (001)-phase No. (5)-transmitter identifier (000), destination (001)-phase No. (5)-delay time (020), destination (002)-phase No. (0)-delay time (0), destination (003)-phase No. (0)-delay time (0), destination (004)-phase No. (0)-delay time (0)].

The information of the communication terminal N2:

[communication identifier (001)-phase No. (5)-transmitter identifier (000), destination (002)-phase No. (5)-delay time (040), destination (003)-phase No. (0)-delay time (0), destination (004)-phase No. (0)-delay time (0)].

The destination management information of the communication terminal N3

[communication identifier (001)-phase No. (5)-transmitter identifier (000), destination (003)-phase No. (5)-delay time (040), destination (004)-phase No. (0)-delay time (0)].

The information of the communication terminal N4:

[communication identifier (001)-phase No. (5)-transmitter identifier (000), destination (004)-phase No. (5)-delay time (040)].

The destination management information of the communication terminal N5:

[communication identifier (001)-phase No. (5)-transmitter identifier (000)].

At this time point, the delay time of only the other side of the communication is detected.

When the link is established, the data transfer is performed.

At a time when the communication terminal N1 completes the notice of destination to the communication terminal N2, it starts the data transmission without waiting for the communication statuses of the other communication terminals. In this case, it transmits the data frame F7. When the communication terminal N1 receives the ACK response frame F4 from the communication terminal N2 in response to the transmission of the data frame F7, it confirms a success of transmission of the data frame F7. However, when the communication terminal N1 receives a NAC acknowledge response or does not receive any response for a constant time period, the communication terminal N1 transmits the data frame F7 again in order to guarantee the reliability of transmission.

When the communication terminal N1 receives the ACK response frame F4, the communication terminal N1 calculates the difference between the transmission time instance and the response time instance which are contained in the ACK response frame F4 to obtain a time difference between the transmission frame and the receiving frame and registers the time difference in the destination management information as the delay time with respect to the communication terminal N2. The communication terminal N1 transmits the delay inquiry frame F8 to the communication terminal N2 by utilizing this delay time interval to start a monitoring of the relay status.

On the other hand, the communication terminal N2 transmits the data from the communication terminal N1 to the communication terminal N3 and measures a delay time from the ACK response frame F4 similarly. When the communication terminal N2 receives the delay inquiry frame F8 from the communication terminal N1, the communication terminal N2 buries the delay information recognized by itself in the delay response frame F9 and sends it to the communication terminal N3.

The communication terminal N1 updates the destination management information according to the delay time in the delay response frame F9 from the communication terminal N2, obtains the maximum delay time in the destination management information and makes it as a new delay time interval.

Since the delay time inquiry frame F8 can return the effective value to the communication terminal N2 only when it is notified to the communication terminal N5, the communication terminal N1 must confirm the delay time up to the communication terminal N5 at least once.

After the communication terminal N1 transmits all data to the communication terminal N2 by repeating the transmissions as mentioned above, it waits a time corresponding to the maximum delay time registered at that in the destination management information. After this time lapses, the communication terminal N1 transmits the delay inquiry to the communication terminal N2 again to conform the relay status. In this case, when all of the communication terminals have completed their communications, it is deemed as an end of communication and a link cut procedure is performed.

The link cut procedure is executed by transmitting the link cut frame F2. When the communication terminal receives the ACK frame F4 responding to the link cut frame F2, the cutting of link is completed.

The destination management information of the respective communication terminals during the data transfer is shown below. In this case, the delay times detected by the delay inquiry frame F8 are set as the delay times of the respective communication terminals.

The communication terminal N1:
[communication identifier (001)-phase No. (6)-transmitter identifier (000),
destination (001)-phase No. (6)-delay time (020),
destination (002)-phase No. (6)-delay time (060),
destination (003)-phase No. (6)-delay time (100),
destination (004)-phase No. (6)-delay time (140)].

The communication terminal N2:
[communication identifier (001)-phase No. (6)-transmitter identifier (000),
destination (002)-phase No. (6)-delay time (040),
destination (003)-phase No. (6)-delay time (080),
destination (004)-phase No. (6)-delay time (120)].

The communication terminal N3:
[communication identifier (001)-phase No. (6)-transmitter identifier (000),
destination (003)-phase No. (6)-delay time (040),
destination (004)-phase No. (6)-delay time (080)].

The communication terminal N4:
[communication identifier (001)-phase No. (6)-transmitter identifier (000),
destination (004)-phase No. (6)-delay time (040)].

The communication terminal N5:
[communication identifier (001)-phase No. (6)-transmitter identifier (000)].

Since it is possible to predict the delay time required for the data transmission preliminarily, as mentioned above, it becomes possible to minimize the number of confirmation times of the existence of the link after the data frame F7 is transmitted.

Incidentally, the present invention can be realized by other communication protocol than the dedicated communication protocol described in the embodiments. For example, a widely used protocol such as TCP/IP may be used. In such case, it is impossible to minimize the error re-transmission and/or the frame transfer for checking the link status.

However, since it is possible to manage the relay status of the relay communication in real time and to predict the relay time of the relay communication, the use of such communication protocol is effective in the re-transmitting operation of the transmitters.

As described hereinbefore, according to the present invention, since it is possible to measure the delay time in a relay communication (delay times of the frame transmission and/or the relay transmission), there is no need of transmitting excessive data which is used for confirming the status of the communication link during a delay occurs, so that it is possible to optimally control the coefficient of circuit usage. In other words, it is possible to utilize the circuit performance of communication circuit at the maximum of efficiency by minimizing the coefficient of circuit use by the amount of data for confirmation and assigning the empty circuit to other data transfer. Thus, it is possible to perform a transmission by using the circuit always optimally without considering the difference in circuit operating rate on the network constituting the transmission path.

Since it is possible to monitor, in real time, the communication status of the relaying communication terminals by the communication terminal as the transmitting station though only the point to point communications are perform, it is possible to manage the communication status of the whole system by the transmitter to thereby immediately detect a communication abnormality such as the drop of station and perform are transmission.

What is claimed is:

1. A relay communication system in which a multiple address communication is realized by repeating a point to point communication a plurality of times, comprising:

means for uniquely identifying a transmitting data on a network on the basis of an identifier of a communication terminal of a transmitting station and an identifier of the data;

means for recognizing the progression of relay communication from said transmitting station when a receiving station is performing a relay transmission;

means for obtaining a delay time until a receiving terminal giving the latest response by measuring response times from said communication terminal of said transmitting station;

means for determining a transmission timing of data for checking an end of said relay communication, according to the delay time;

means for obtaining a phase number, wherein the phase number indicates a status of the communication; and means for obtaining delay information, wherein delay information is the difference between a transmitting time and a response time indicated in the response frame and the phase number.

2. A communication terminal comprising:

a receiving control portion for receiving data in frames from a receiving communication circuit;

a transmission control portion for transmitting data in frames from a transmitting communication circuit;

a memory portion for temporarily storing the receiving data;

a time management portion for managing an internal time and burying time stamps in a receiving frame and a transmitting frame;

a destination management portion for managing destinations;

a data identification portion for uniquely identifying a communication to which the frames belong, on the basis of a communication identifier and a transmitter identifier in the frame, to obtain the address from said destination management portion and storing the address in said memory portion;

a delay management portion for measuring a delay time due to a relay communication by transmitting a monitor frame and receiving a response frame at a constant interval through said transmitting control portion and said receiving control portion; and a main control portion for controlling the whole communication terminal;

a phase number portion, wherein the phase number indicates a status of the communication.

3. A communication terminal as claimed in claim 2, wherein said destination management portion comprises a destination management information table for registering a transmitter identifier information indicative of an identifier number of said transmitting communication terminal, which is uniquely determined in said network, a communication identifier information indicative of an identifier number of a communication managed in transmitter unit, a phase number information which is a value indicative of the progression of the communication, a destination information indicative of addresses of communication terminals of the respective destinations, a delay information obtained by a difference between a transmitting time instance and a response time instance indicated in the response frame and the phrase number information.

4. A communication terminal as claimed in claim 2, wherein said communication terminal operates under control of said main control portion in such a way that:

in a case where said communication terminal is used as a transmitting station, upon data inputted to said memory portion, said transmission control portion starts a transmission by transmitting a link connection frame to a first receiving station of addressed receiving stations and, upon an acknowledge response from said first receiving station, transferring data thereto, transmitting a destination to said receiving station by burying the destination in the address assignment frame, upon a reception of an acknowledge response frame from said receiving station, said delay management portion obtains a delay time from a difference between a transmission time instance and a response time instance both contained in the response frame responding to the transmission frame starts a timer corresponding to the delay time, transmits a delay inquiry response frame upon a timing-up of said timer or transmits a data frame when the delay inquiry frame is not transmitted, registers the delay time in a delay response frame therein when the delay response frame responding to the delay inquiry frame is received from said receiving station, transmits the delay inquiry frame every delay time thereafter, activates the timer corresponding to the delay time after all data frames are transmitted, transmits a delay inquiry frame when said timer times up and waits for the delay inquiry response frame, transmits a link cut frame when the delay inquiry frame indicates an end of a relay operation and ends a communication upon a reception of an acknowledge frame, in a case where said communication terminal is used as a receiving station, said receiving station starts a receiving operation when said receiving control portion receives a reception of a link connection frame by transmitting an acknowledge response frame responding to the link connection frame, notifies said destination management portion of a destination assignment frame, extracts a real data from a data frame received by said receiving control portion and writes the real data in said memory portion, upon a reception of a data frame, sets a response time instance in an acknowledge response frame and transmits the acknowledge response frame, notifies said main control portion of a link cut frame when the link cut frame is received and ends a communication by transmitting an acknowledge response frame, and in a case where said communication terminal is used as a relay station, said relay station operates as said receiving station with respect to a transmitting side and operates as said transmitting station with respect to a receiving side.

5. A data transfer guaranty monitor method in a relay communication system in which a multiple address communication is realized by repeating a point to point communication a plurality of times, comprising the steps of;

uniquely identifying a transmitting data on a network on the basis of an identifier of a communication terminal of a transmitting station and an identifier of data;

recognizing in real time a relay transmission by recognizing the progression of the relay communication from the transmitting station when a receiving station performs the relay transmission;

measuring a response time of the other side of the communication by the communication terminal of the transmitting station to obtain a delay time of the receiving station whose response is the latest to thereby measure the delay time caused by the relay communication; and determining a data transmission timing for checking an end of the relay communication according to the delay time;

transmitting a delay inquiry frame after a delay time has been exceeded; and receiving a delay response frame in response to the delay inquiry frame indicating and of an operation.

6. A data transfer guaranty monitor method as claimed in claim 5, wherein the step of obtaining the delay time comprises the steps of setting a transmission time information indicative of a transmission time of an information frame transmitted from the transmitting station to the receiving station, setting the transmission time information in the information frame and a response time information indicative of a transmission time of a response frame responding to the information frame sent from the receiving station to the transmitting station in the response frame and obtaining in the transmitting station a difference between the transmission time and the response time information set in the response frame as the delay time.

* * * * *